United States Patent [19]

Hirabayashi et al.

[11] Patent Number: 5,259,645

[45] Date of Patent: Nov. 9, 1993

[54] METHOD OF PRODUCING AN AIRBAG HAVING DOUBLY WOVEN AND SINGLY WOVEN CLOTH PORTIONS, FOR AN AIRBAG RESTRAINT SYSTEM

[75] Inventors: Hirokazu Hirabayashi, Atsugi; Hironori Yoshikawa, Zama, both of Japan

[73] Assignee: Nissan Motor Co., Ltd., Yokohama, Japan

[21] Appl. No.: 809,178

[22] Filed: Dec. 18, 1991

[30] Foreign Application Priority Data

Dec. 27, 1990 [JP] Japan .................................. 2-408011

[51] Int. Cl.$^5$ ........................ B60R 21/16; B05D 1/36
[52] U.S. Cl. ..................... 280/743; 427/412
[58] Field of Search ............... 280/728, 743, 729; 427/412, 743 R

[56] References Cited

U.S. PATENT DOCUMENTS

| | | | |
|---|---|---|---|
| 3,792,873 | 2/1974 | Buchner et al. | 280/150 AB |
| 3,892,425 | 7/1975 | Sakairi et al. | 280/150 AB |
| 5,011,183 | 4/1991 | Thornton et al. | 280/743 |
| 5,094,477 | 3/1992 | Togawa | 280/743 |
| 5,110,666 | 5/1992 | Menzel et al. | 428/196 |
| 5,114,180 | 5/1992 | Kami et al. | 280/743 |

FOREIGN PATENT DOCUMENTS 56-102757 8/1981 Japan .
2-204151A 8/1990 Japan .

Primary Examiner—Shrive Beck
Assistant Examiner—Bret Chen
Attorney, Agent, or Firm—Foley & Lardner

[57] ABSTRACT

A method of producing an airbag of an airbag restraint system to protect an automotive vehicle passenger from a secondary impact inside the vehicle in the event of a serious collision. The producing method is carried out as follows: A loom weaves an extending cloth including a linearly aligned doubly woven cloth sections each having first and second singly woven cloth portions which are separate from each other, each doubly woven cloth section forming part of an airbag. A first coating is formed continuously on whole one surface of the extending woven cloth. A second coating is formed continuously on a straight extending central part of the other surface of the extending woven cloth. A hole for an inflator is formed at a central part of the second singly woven cloth portion of the doubly woven cloth section. Each part of the woven cloth corresponding to the airbag is trimmed from the extending woven cloth. Finally, the trimmed part is turned inside out by drawing the inside surface through the hole.

10 Claims, 3 Drawing Sheets

METHOD OF PRODUCING AN AIRBAG HAVING DOUBLY WOVEN AND SINGLY WOVEN CLOTH PORTIONS, FOR AN AIRBAG RESTRAINT SYSTEM

BACKGROUND OF THE INVENTION

1. Field of the Invention

This invention relates to improvements in a method of producing an airbag of an airbag restraint system which protects a passenger from a second impact inside a vehicle, such as automotive vehicle, upon the inflation of the airbag in the event of a vehicle collision. The airbag is normally disposed in its folded state in front of the passenger.

2. Description of the Prior Art

An airbag of an airbag restraint system is usually disposed in its folded state inside a padded steering wheel or an instrument panel located in front of a vehicle passenger. In the event of a vehicle collision, an inflator or gas generator is operated in response to a collision signal from a collision sensor and discharges gas which is supplied under pressure into the folded airbag. Then, the airbag inflates and develops toward the vehicle passenger, who is moving forward under inertia, thereby softly restraining the passenger to protect the passenger from coming into direct contact with either the steering wheel and/or the windshield.

An example of the airbag is arranged as follows: The airbag is made of front and rear side cloths which are sewn at their peripheral portion with each other to form a bag-shaped arrangement. The thus formed airbag is turned inside out so that a sewn portion is located inside the airbag. The rear side cloth is formed at its central part with a hole in which a part of the inflator is disposed. The airbag is fixed at its peripheral portion around the hole to the inflator to maintain a gas tight seal by means of rivets or the like.

High pressure gas directly strikes against the front side cloth upon operation of the inflator, and therefore the whole inside surface of the front side cloth is coated with a coating of a resinous material such that it becomes heat resistant and gas tight. Additionally, concerning the rear side cloth, the same resinous material is coated at the peripheral portion and the central portion thereby to prevent fraying of the peripheral and central portions of the rear side cloth. At the peripheral portion, the rear side cloth is sewed to the front side cloth. At the central portion formed with the hole for the inflator, the rear side cloth is fixed to the inflator by using the rivets or the like.

However, drawbacks have been encountered in the production process of the above-discussed conventional airbag, as set forth below. That is, the production process requires a sewing step for the front and rear side cloths upon forming the resinous coating on the front and rear side cloths. Additionally, the resinous coating is required to be formed at the peripheral portion with a predetermined width and at the central portion with a predetermined width larger than the hole for the inflator, thereby making it difficult to carry out a continous coating operation. Thus, the production process of the airbag is complicated and disadvantageous from a point of view of production cost.

SUMMARY OF THE INVENTION

An object of the present invention is to provide an improved production method for an airbag of an airbag restraint system, which can overcome drawbacks encountered in conventional production processes of airbags, and be suitable for mass production of the airbag.

Another object of the present invention is to provide an improved production method an airbag of an airbag restraint system, which facilitates production of the airbag while lowering production cost of the airbag.

A further object of the present invention is to provide an improved production method an airbag of an airbag restraint system, by which a sewing step for the peripheral portions of two cloths are omitted while making possible a continuous coating of a resinous material on the continuously aligned component cloths.

A method of the present invention for producing an airbag of an airbag restraint system is comprised of the following steps in the sequence set forth: (1) An airbag base cloth including a doubly woven cloth section is formed. The doubly woven cloth section has first and second singly woven cloth portions. The airbag base cloth has a first surface including a surface of the first singly woven cloth portion, and a second surface including a surface of the second singly woven cloth portion; (2) A first coating is formed on the whole first surface of the airbag base cloth; (3) A second coating is formed partly on the second surface of the airbag base cloth and has a predetermined width. The second coating partly covers the surface of the second singly woven cloth portion of the airbag base cloth doubly woven cloth section, and extends in a direction through a central part of the singly woven cloth portion; (4) A hole is formed in the central part of the second singly woven cloth prtion of the airbag base cloth doubly woven cloth section. The hole is formed through and located within the second coating. At least a part of an inflator is disposed in the hole; and (5) The airbag base cloth is turned inside out by using the hole.

According to the method of the present invention, the peripheral parts of the two cloth portions of the airbag base cloth are formed integral in a single weaving step in which a doubly woven cloth section is formed, and therefore a sewing operation which is separate from the weaving step of the cloth is not required to connect the peripheral parts to each other as in the prior art. Additionally, the coating is formed on one whole side surface of the airbag base cloth while being formed on part of the other side surface of the same to extend in one direction with the predetermined width. Therefore, the coating operation can be made along one direction, thereby making it possible to carry out a continuous coating operation onto many airbag base cloths which are linearly aligned. As a result, the production process of the airbag is simplified while lowering the production cost thereof.

BRIEF DESCRIPTION OF THE DRAWINGS

In the drawings, like reference numerals designate like elements and parts throughout all the figures, in which.

DETAILED DESCRIPTION OF THE INVENTION

Figure 1:
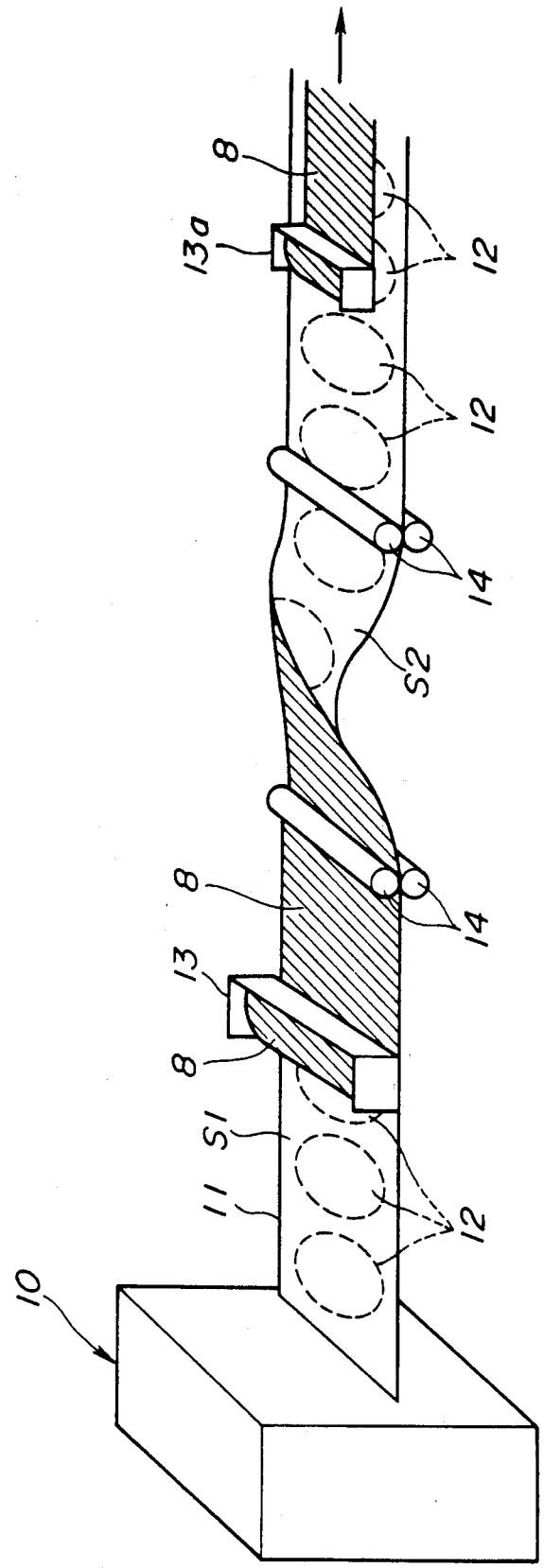
FIG. 1 is a perspective view of a production system of an airbag, employing the principle of a production method according to the present invention.

Referring now to FIG. 1, there is shown a system for continuously producing a plurality of airbags each used in an airbag restraint system for an automotive vehicle. The airbag restraint system is arranged such that the airbag is inflated to protect a vehicle passenger from coming into direct contact with a steering wheel (not shown) and/or a front windshield (not shown) in a serious vehicle collision. The production system includes a weaving loom 10 which continuously weaves a cloth 11 which has a predetermined width and extends in the direction of the arrow. The cloth 11 has a plurality of circular airbag base cloths 12 each of which is indicated by a broken line circle. The airbag base cloths 12 are aligned along the length of the woven cloth 11.

Figure 3:
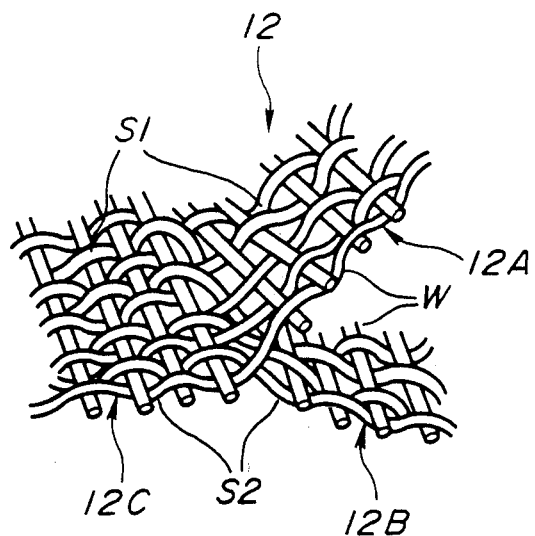
FIG. 3 is an enlarged perspective view of a part of the airbag produced by the production method according to the present invention.

Each airbag base cloth 12 includes a singly woven section 12C (as shown in FIG. 3) formed along the periphery of the airbag base cloth 12 and has a predetermined width. A circular doubly woven section W (as shown in FIG. 3) is formed inside the singly woven section 12C. The doubly woven section W includes two singly woven cloth portion 12A, 12B which are integral through continuous yarns with the singly woven section 12C as clearly shown in FIG. 3. It will be understood that a part of the woven cloth 11 other than the circular bag base cloth 12 is in the singly woven state and is integral with the singly woven cloth section 12C. The singly woven cloth section 12C serves to connect the singly woven cloth portions 12A, 12B of the singly woven cloth section 12C, and therefore will be also referred to as a "connecting section".

As shown, the woven cloth 11 is continuously coated on its upper surface S1 with a flexible resinous material such as flexible synthetic resin or an elastomeric material to form a coating 8 of the resinous material immediately after being drawn from the loom 10, by using a so-called doctor knife 13. The resinous material prevents gas from permeating or penetrating therethrough. The coating 8 is formed on the whole upper surface S1. An outer side surface of the singly woven cloth portion 12A in FIG. 3 corresponds to the upper surface S1. It will be understood that the coating 8 is formed on the whole surface S1 and the outer side surface (contiguous with the surface S1) of the singly woven cloth portion 12C.

The thus coated cloth 11 is turned over or upside down under the action of a plurality of units of turn-over rollers 14, so that the upper surface S1 is located at the lower side while a lower surface S2 is located at the upper side. Each unit of the turn-over rollers 14 is made up of oppositely located rollers between which the cloth 11 is movably inserted. Immediately after the cloth 11 turned over, the surface S2 is coated with the resinous material by the doctor knife 13a to form the coating 8 which is located at the central part in the width direction of the cloth 11 and extends along the length of the cloth 11 at a predetermined width.

Figure 2:
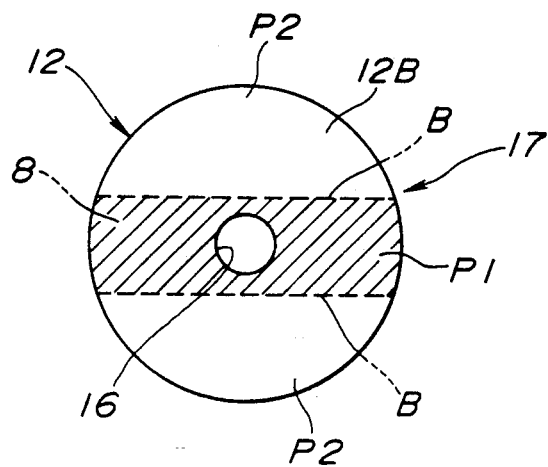
FIG. 2 is a rear side view of the airbag produced by the production method according to the present invention.

In each airbag base cloth 12, the thus formed coating 8 on the lower surface S2 straightly extends through a central part P1 of the airbag base cloth 12 as shown in FIG. 2 so that no coating is formed on parts P2 of the surface S2 other than the central part P1. The central part P1 straightly extends in a direction or the direction of the length of the woven cloth 11. The outer side surface of the singly woven cloth portion 12B shown in FIG. 3 corresponds to the surface S2 of the cloth 11. The width of the coating 8 on the surface S2 is set to be larger than the diameter of a hole 16 for an inflator 6 which will be discussed therein after, as shown in FIG. 2.

The cloth 11 whose both surfaces S1, S2 are formed respectively with the coatings, then undergoes a trimming (not illustrated) in which the airbag base cloths 12 are continuously trimmed along the broken circular lines (corresponding to the outer periphery of the airbag base cloth 12) shown in FIG. 1. Thereafter, the cloth 11 without the airbag base cloths 12 is rolled up on a take-up roller (not shown).

The thus obtained airbag base cloth 12 includes the doubly woven cloth section W having the two singly woven cloth portions 12A, 12B which are separate from each other as shown in FIG. 3. The two singly woven cloth portions 12A, 12B are integral at their periphery with the singly woven cloth or connecting section 12C, in which the yarns of the singly woven cloth portions 12A, 12B extend to the singly woven cloth section 12C. As discussed above, the doubly woven cloth section W is formed circular, while the singly woven cloth section 12C is formed annular and located around the doubly woven cloth section W in a manner to be contiguous with the doubly woven cloth section W. Therefore, the coating 8 is formed on whole the upper side surface of the contiguous singly woven cloth portion 12A and singly woven cloth section 12C, while the coating 8 is formed on only the central part P1 of the lower side surface of the contiguous singly woven cloth portion 12B and the singly woven cloth section 12C as shown in FIG. 2.

The hole 16 is formed at the central part of the singly woven cloth portion 12B as shown in FIG. 2. The diameter of the hole 16 is smaller than the width of the coating 8 formed on the singly woven cloth portion 12B. Finally, the airbag base cloth 12 is turned inside out by drawing out the inside of the singly woven cloth portion 12A through the hole 16 so that the coatings 8 are located inside, thereby obtaining an airbag 17 of the bag-shape as shown in FIG. 4.

Figure 4:
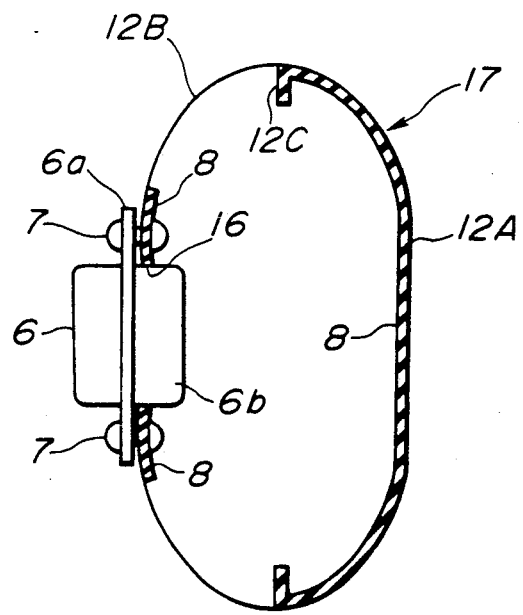
FIG. 4 is a schematic cross-sectional view of the airbag produced by the production method according to the present invention.

As seen from FIG. 4, the airbag 17 is installed to an inflator or gas generator 6 in such a manner that a gas discharge section 16a from which gas is discharged under pressure is projected inside the airbag 17 through the hole 16. The peripheral portion of the airbag 17 defining the hole 16 is fixedly secured to an annular flange 6b of the inflator 6 by means of rivets 7 or the like, so that the hole 16 is sealed to maintain a gas tight seal. In the thus produced airbag 17, since the coating 8 formed on the one side surface covers the border of the connecting section 12C and the doubly woven section W, the constituent yarns are prevented from shifting at the boarder, avoiding fray of the outer peripheral portion of the connecting section 12C. Additionally, the coating 8 prevents the yarns of the peripheral portion of the airbag 17 around the hole 16 from being frayed.

The airbag 17 installed to the inflator 6 is first folded, upon being deflated by contacting the two singly woven cloth portions 12A, 12b, along the bending lines B, B or the border between the part P1 and each part P2 indicated in FIG. 2. Thereafter, the airbag 17 will be further folded compactly on the inflator 6. As a result, the uncoated parts P2, P2 of the singly woven cloth portion 12B are located between the coated part P1 and the coated singly woven cloth portion 12A, so that high pressure gas discharged from the inflator gas discharge section 6a is supplied into a space confined between the the coated part P1 of the singly woven cloth portion 12B and the coated singly woven cloth portion 12A. Therefore, the discharged gas effectively inflates the deflated airbag 17. Upon inflation of the airbag 17, a part of the gas inside the airbag 17 releases through the uncoated parts P2 shown in FIG. 2, so that the airbag 17 serves as a soft cushion.

Figure 5:
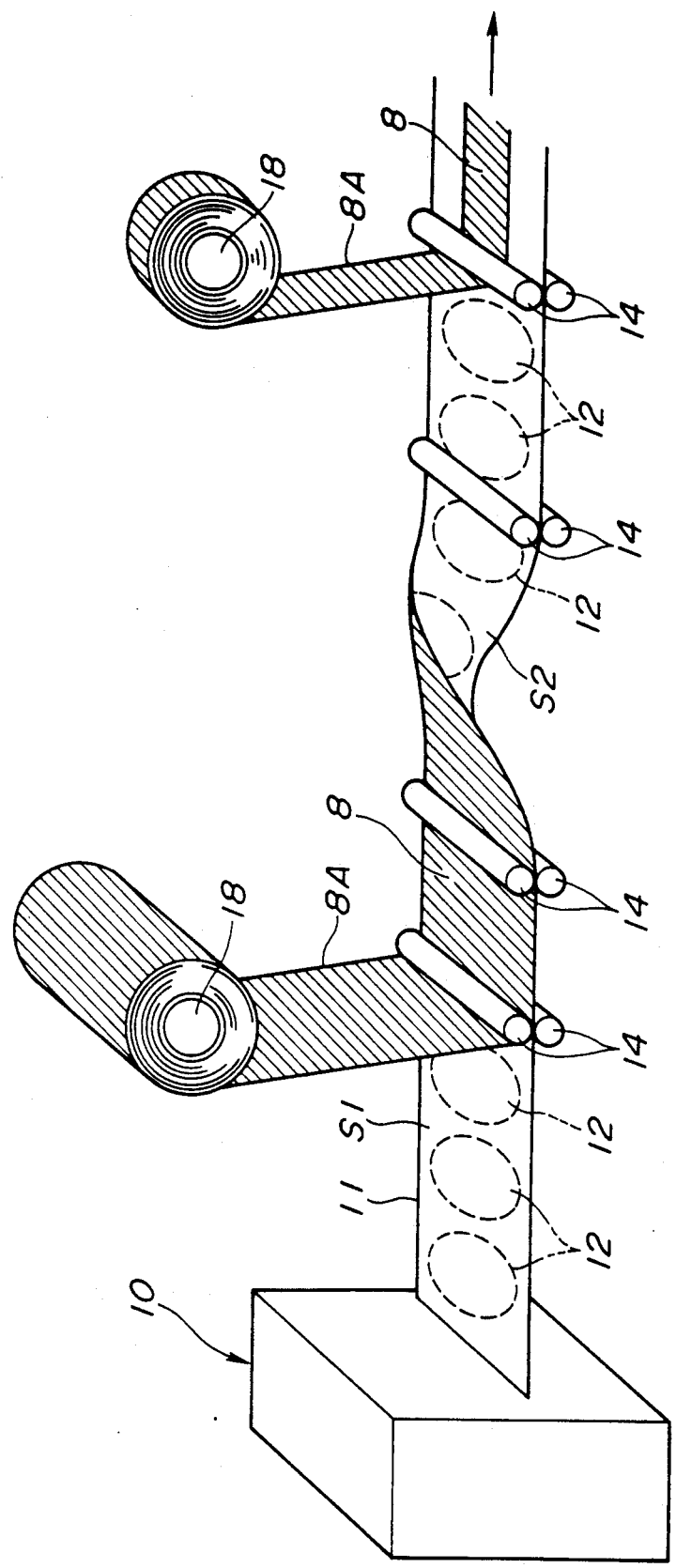
FIG. 5 is a perspective view of another production system similar to that in FIG. 1 which system employs the principle of the production method according to the present invention.

FIG. 5 illustrates another system for continuously producing the airbags 17, which is similar to that shown in FIG. 1. In this production system, a film 8A made of the resinous material and wound on a roll shaft 18 is laminated on whole the upper surface S1 of the woven cloth 11 (having doubly woven cloth sections W) drawn out from the loom 10, thereby forming a lamination or coating 8. After the thus coated woven cloth 11 is turned over under the action of the turn-over rollers 14, another film 8A made of the resinous material and wound on another roll shaft 18 is laminated on the opposite side surface S2 along the central part of the surface S2 to form a lamination or coating 8 on the part P1 of the cloth portion 12B of the doubly woven cloth section W of the airbag 17 as shown in FIG. 2. The thus laminated cloth 11 is thereafter processed the same as in the case of using the production system of FIG. 1, therefore an explanation of this process has not been reprinted.

What is claimed is:

1. A method of producing an airbag of an airbag restraint system, comprising the steps in the sequence set forth:
   forming an airbag base cloth including a doubly woven cloth section having first and second singly woven cloth portions, said airbag base cloth having a first surface including a surface of said first singly woven cloth portion, and a second surface including a surface of said second singly woven cloth portion;
   forming a first coating on the whole first surface of said airbag base cloth;
   forming a second coating on a portion of the second surface of said airbag base cloth, said second coating partly covering said surface of said second singly woven cloth portion of said airbag base cloth doubly woven cloth section and extending in a direction completely through a central part of said second singly woven cloth portion;
   forming a hole in a central part of said second singly woven cloth portion of said airbag base cloth doubly woven cloth section, said hole being formed through and located within said second coating, at least a part of an inflator being disposed in said hole; and
   turning said airbag base cloth inside out by using said hole.

2. A method as claimed in claim 1, wherein the step of turning said airbag base cloth is carried out by drawing out said first singly woven cloth portion of said doubly woven cloth section through said hole.

3. A method as claimed in claim 1, wherein the step of forming said airbag base cloth includes weaving an extending cloth having a plurality of aligned parts each corresponding to said airbag base cloth.

4. A method as claimed in claim 2, wherein the step of forming said first coating includes continuously forming said first coating on a first surface of an extending cloth such that said first surface of said extending cloth is completely coated, said first surface of said extending cloth being contiguous with the first surface of said airbag base cloth.

5. A method as claimed in claim 4, wherein the step of forming said second coating includes continuously forming said second coating on a portion of a second surface of said extending cloth such that second coatings on respective second surfaces of additional airbag base cloths are contiguous in the direction of the length of said extending cloth, said second surface of said extending cloth being contiguous with said second surfaces of said airbag base cloths.

6. A method as claimed in claim 5, further comprising the step of turning over said extending cloth after the step of forming said first coating, so that said first and second surfaces of said extending cloth are turned upside down.

7. A method as claimed in claim 1, wherein the steps of forming said first and second coatings are carried out by coating said first and second surfaces of said airbag base cloth with a material which prevents gas from permeating therethrough.

8. A method of producing an airbag of an airbag restraint system, comprising the steps in the sequence set forth:
   forming an airbag base cloth including a doubly woven cloth section having first and second singly woven cloth portions, said airbag base cloth having a first surface including a surface of said first singly woven cloth portion, and a second surface including a surface of said second singly woven cloth portion, the step of forming said airbag base cloth including weaving an extending cloth having a plurality of aligned airbag base cloths;
   continuously forming a first coating on a first surface of said extending cloth to completely cover said first surface of said extending cloth, and wherein said first surface of said extending cloth includes the first surfaces of said airbag base cloths;
   continuously forming a second coating on a portion of the second surfaces of said airbag base cloths, said second coating partly covering said surfaces of said second singly woven cloth portions of said airbag base cloth doubly woven cloth sections and extending in a direction completely through a central part of said second singly woven cloth portions, the step of forming said second coating including continuously forming said second coating on part of a second surface of said extending cloth such that said second coatings on the respective second surfaces of said airbag base cloths are contiguous in the direction of the length of said extending cloth, said second surface of said extending cloth including said second surfaces of said airbag base cloths;
   forming a hole in the central part of at least one of said second singly woven cloth portions of said airbag base cloths doubly woven cloth sections, said hole being formed through and located within said second coating, at least a part of an inflator being disposed in said hole; and turning said airbag base cloth which includes said hole inside out by using said hole.

9. A method of producing an airbag of an airbag restraint system, comprising the steps in the sequence set forth:

forming an airbag base cloth including a doubly woven cloth section having first and second singly woven cloth portions, said airbag base cloth having a first surface including a surface of said first singly woven cloth portion, and a second surface including a surface of said second singly woven cloth portion, the step of forming said airbag base cloth including weaving an extending cloth having a plurality of aligned airbag base cloths;

continuously forming a first coating on a first surface of said extending cloth to completely cover said first surface of said extending cloth, and wherein said first surface of said extending cloth includes the first surfaces of said airbag base cloths;

continuously forming a second coating on a portion of the second surfaces of said airbag base cloths, said second coating partly covering said surfaces of said second singly woven cloth portions of said airbag base cloth doubly woven cloth sections and extending in a direction completely through a central part of said second singly woven cloth portions, the step of forming said second coating including continuously forming said second coating on part of a second surface of said extending cloth such that said second coatings on the respective second surfaces of said airbag base cloths are contiguous in the direction of the length of said extending cloth such that non-coated portions of said surfaces of said second singly woven cloth portions are separated by said second coating, said second surface of said extending cloth including said second surfaces of said airbag base cloths;

forming a hole in a central part of at least one of said second singly woven cloth portions of said airbag base cloths doubly woven cloth sections, said hole being formed through and located within said second coating, at least a part of an inflator being disposed in said hole; and turing said airbag base cloth which includes said hole inside out by using said hole.

10. A method of producing an airbag of an airbag restraint system, comprising the steps in the sequence set forth:

forming an airbag base cloth including a doubly woven cloth section having first and second singly woven cloth portions, said airbag base cloth having a first surface including a surface of said first singly woven cloth portion, and a second surface including a surface of said second singly woven cloth portion;

forming a first coating on the whole first surface of said airbag base cloth;

forming a second coating on a portion of the second surface of said airbag base cloth, said second coating partly covering said surface of said second singly woven cloth portion of said airbag base cloth doubly woven cloth section and extending in a direction completely through a central part of said second singly woven cloth portion such that non-coated portions of said second singly woven cloth portion are separated by said second coating;

forming a hole in a central part of said second singly woven cloth portion of said airbag base cloth doubly woven cloth section, said hole being formed through and located within said second coating, at least a part of an inflator being disposed in said hole; and turning said airbag base cloth inside out by using said hole such that said first and second surfaces of said airbag base cloth define two surfaces of said airbag.

* * * * *